United States Patent [19]

Takimoto et al.

[11] Patent Number: 5,132,807
[45] Date of Patent: Jul. 21, 1992

[54] RECORDING APPARATUS FOR RECORDING MAIN INFORMATION WITH ADDITIONAL INFORMATION

[75] Inventors: Hiroyuki Takimoto; Koji Takahashi; Mikihiro Fujimoto, all of Kanagawa, Japan

[73] Assignee: Canon Kabushiki Kaisha, Tokyo, Japan

[21] Appl. No.: 383,791

[22] Filed: Jul. 21, 1989

[30] Foreign Application Priority Data

Jul. 28, 1988 [JP] Japan .................................. 63-189703
Jul. 28, 1988 [JP] Japan .................................. 63-189704

[51] Int. Cl.⁵ ............................................. H04N 5/76
[52] U.S. Cl. ................................. 358/335; 358/341; 358/343; 358/310
[58] Field of Search ............. 358/341, 343, 310, 335, 358/906; 360/9.1, 18, 19.1, 20, 13, 22, 27, 32, 33.1, 35.1

[56] References Cited

U.S. PATENT DOCUMENTS 4,575,772  3/1986  Shimada et al. .................... 360/19.1
4,768,106  8/1988  Ito et al. ............................. 360/14.1

Primary Examiner—Roy N. Envall, Jr.
Assistant Examiner—Robert Chevalier
Attorney, Agent, or Firm—Robin, Blecker, Daley & Driscoll

[57] ABSTRACT

An apparatus for recording main information signals in tracks formed on a recording medium, wherein the track is not only made up from the recording area for the main information signals, but also provided with a recording area for additional information signals, whereby digital additional information signals and analog additional information signals are recorded in frequency-multiplexed relation on the additional information signal recording area, thus forming an information signal recording apparatus.

18 Claims, 12 Drawing Sheets

RECORDING APPARATUS FOR RECORDING MAIN INFORMATION WITH ADDITIONAL INFORMATION

BACKGROUND OF THE INVENTION

1. Field of the Invention

This invention relates to an information signal recording apparatus and, more particularly, to an apparatus for recording main information signals in tracks formed on a recording medium. Still more particularly, it relates to an apparatus for recording not only main information signals, but also additional information signals.

2. Description of the Related Art

The following in this written specification is described by taking an example of a helical scan type video tape recorder (VTR) as the apparatus of this kind.

The helical scan type VTR has been known to provide a model in which a magnetic tape is wound around a cylinder in an angular coverage of 221°, the cylinder having a pair of recording or reproducing rotary magnetic heads located in spaced relation by an angular difference of 180°. Of the coverage, a region of 180° is assigned to recording of video signals, and another region of 36° to recording of sound signals compressed in the time axis.

FIG. 1 shows an example of the record format of such a model of VTR. The rotary magnetic head starts to contact the tape from the left side and forms a helical track. Within this helical track, there is provided an inrush portion 6 of 5° in rotation angle, of which the latter part of 2.06° forms a clock run-in portion 7 to make synchronize it with PCM data. This clock run-in portion 7 is followed by a time-axis-compressed PCM audio data portion 8 of 26.32°. Successive to this PCM audio data portion 8 there is provided a back margin portion 9 of 2.06° to cope with the recording position gap produced when after-recording by the difference between apparatus. Between the PCM audio data portion 8 and the next video signal portion 11 there is further a guard band portion 10. The next 180° part contains a video signal portion 11 and a separation portion 12 of 5°.

According to such a record format, the video signals for every one field are recorded in, or reproduced from, the video signal portion 11 of every one track, while the PCM audio data obtained by compressing the audio signal for 1/60 sec. in the time axis is recorded in, or reproduced from, the PCM data portion 8.

Meanwhile, the video signal portion 11 in the record format described above is divided into five parts, so that, as they are equalized to each other, each subtends 36°, thus totaling six segments in constituting the PCM audio portion. Such a record format, too, has been proposed. FIG. 2 shows this record format adapted solely to be used for PCM audio data. First of all, each track has six segments 5, 13, 14, 15, 16 and 17, of which the first segment 5 comprises the aforesaid inrush portion 6 of the rotary head through the guard band portion 10, the next or second segment 13 is constructed in the same form, comprising an inrush portion 19, a clock run-in portion 20, a PCM data portion 21, a back margin portion 22 and a guard band portion 23, and the third to the sixth segments 14, 15, 16 and 17 are formed likewise.

The use of such a record format provides a possibility of recording or reproducing PCM audio data independent of each other in the respective segments. Also, by using the flying erase head, it is also possible to erase the PCM audio signal of the desired segment and then rewrite in this segment.

With the conventional VTR model having the fixed head, heading signal time code, date and other items of additional information, are generally recorded by that fixed head in the track assigned to the control (CTL) signal for tracking along with the CTL signal.

Without using the fixed head, the aforesaid additional information may be recorded only by the rotary head. In a known method, besides the area assigned to record the main information signals, such as video signals and audio signals, there is provided a recording area for the additional information, and the items of additional information to be recorded in this new area are broadened.

Also, as to the recording signal form of this additional information, either digital signals or analog signals has been proposed.

Meanwhile, in recent years, use of a new type of VTR with a video camera in unified form, or a so-called camera-unified type VTR, is spreading.

FIG. 3 shows an example of the construction of the conventional camera-unified type VTR. A time information recording and reproduction device in the camera-unified type VTR comprises, as shown in FIG. 3, a time code generator 36 and a character generator 35 responsive to the time code for producing an output signal which is then multiplexed by an adder 34 on the video signal produced from the known circuit comprising an image sensor 32 with an optical system 31, a camera signal processing circuit 33 and others. In short, it has been the common practice that the time code is recorded as the character information in the form of a video signal. This character information-multiplexed video signal, along with four pilot signals (4f) to be used in the 4-frequency type tracking control of audio signals, is converted to a recording signal of the form suited to be recorded by a recorder signal processing circuit 37. This recording signal passes through an amplifier 38 and a head switch 41 to the rotary heads 39-a and 39-b by which it is recorded on a tape-shaped recording medium or magnetic tape 40.

When the aforesaid signal is reproduced, the recorded information of the time code generator 36 appears in a portion of the picture taken by the optical system 31.

Another method of recording the time code is by using the longitudinal track formed in the vicinity of the tape. Yet another method is to create a sub-code recording area in each track as separated from the recording area for the main information so that the time code is recorded as a sub-code in this sub-code recording area.

By the way, in a case where the time code is recorded as the character information in the form of a video signal, because it is multiplexed on the video signal, it always is displaced in superimposed relation on the picture when reproduced. Therefore, when reproducing, the date letters and the picture cannot be separated from each other. Also, in recording foreseeing whether the date will be necessary or unnecessary when reproducing, the photographer must determine in advance which position the selector switch should be set in. Further, this leads to the impossibility of knowing the time information of those picture frames which lack the character information representing the time code imposed thereon.

Also, in a case where the time code is recorded in the longitudinal track, because the relative speed of the tape and the fixed head is low, a lot of information cannot be expected to record. Therefore, it is difficult to record those fractions of the time code which are in shorter time units, and a wide variety of items of additional information. Further, because the necessity of providing the fixed head arises, it is unfavorable since the tape will wear out fast and an increase of the complexity of the mechanisms is called for.

Further, in a case where the time code is recorded as a sub-code in the sub-code recording area provided in each track, this sub-code information is difficult to read when in reproduction with the tape running at a high speed, for example, for forward or backward searching of the VTR. This tendency is more prominent particularly when the so-called azimuth recording is effected.

In more detail, generally when the additional information is recorded as the digital signal, the additional information is hardly extracted at the time of the fast running of the tape. This arises because the clock synchronism is broken due to the change of the relative speed of the head and the tape from when usually recorded. Also, when the so-called azimuth recorded tape is reproduced, the rotary heads are caused to move across some tracks. Therefore, the difficulty of extracting the additional information is increased.

Meanwhile, in a case where the additional information is recorded as the analog signal, regardless of the speed of transportation of the tape, the additional information can be extracted relatively easily. However, generally the track cannot afford so much large recording area as the additional information recording area. In accompaniment with this, the quantity of additional information available to record in the form of analog signals is caused to be very little.

SUMMARY OF THE INVENTION

An object of the present invention is to solve all the above-described problems.

Another object of the invention is to provide an information signal recording apparatus in which taking a larger recording area for additional information, a lot of information as the information quantity of the additional information can be recorded without taking a larger recording area for additional information, and in which the necessary additional information can be extracted even when the recording medium is transported at the high speed.

Under such an object, according to the invention, in one embodiment thereof, an information signal recording apparatus is proposed, comprising head means for recording a signal on a recording medium, main generating means for producing a first recording signal concerning a main information signal, first forming means for producing a digital additional information signal, second forming means for producing an analog additional information signal, mixing means for mixing the digital additional information signal and the analog additional information signal to produce a second recording signal, and time-division multiplex means for supplying the first recording signal and the second recording signal in time-divisionally multiplex to the head means.

Still another object of the invention is to provide a video signal recording apparatus which enables additional information to be recorded in such a way that even when the recording medium is transported at the high speed, it can be extracted, and in which a lot of additional information codes can be recorded while allowing the density of recorded information to.

Under such an object, according to the invention, in one embodiment thereof, a video signal recording apparatus is proposed, comprising means for producing a video signal, means for producing a pilot signal for tracking control, means for digital additional information comprising at least two bits, modulating means for modulating the digital additional information by an analog carrier wave signal to produce an analog additional information signal, the analog carrier wave signal having a frequency in between the frequency band of the video signal and the frequency of the pilot signal, mixing means for frequency-multiplexing the video signal, the pilot signal and the analog additional information signal to produce a recording signal, and recording means for recording the recording signal obtained by the mixing means on a recording medium.

Other than those described above, objects of the invention and its features will become apparent from the following detailed description with reference to the drawings:

DETAILED DESCRIPTION OF THE PREFERRED EMBODIMENTS

The present invention is next described in connection with embodiments thereof applied to the VTR by reference to the drawings.

Figure 4:
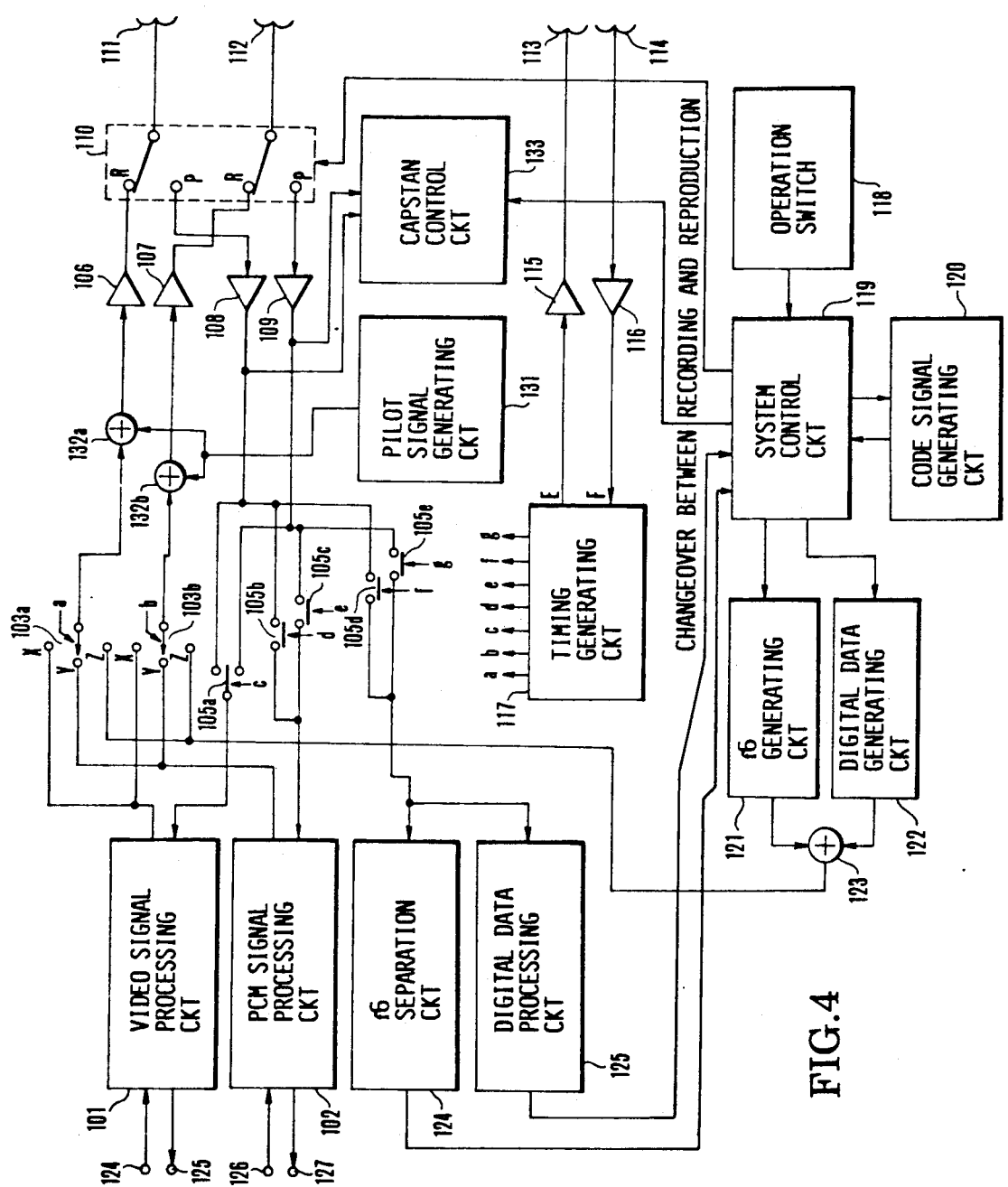
FIG. 4 is a diagram roughly illustrating the construction of an embodiment of a VTR according to the invention.

FIG. 4 schematically shows the construction of a VTR in one embodiment of the invention. The video signal enters into and exits from a video signal processing circuit 101 through an input terminal 124 and an output terminal 125 respectively. The output of this video signal processing circuit 101, at which the video signals to be recorded are produced, is connected to the X terminals of selection switches 103a and 103b. Also, an input terminal 126 and an output terminal 127 of the PCM audio signal are connected to a PCM audio signal processing circuit 102. The output of this PCM signal processing circuit 102, at which the audio signals to be recorded are produced, is connected to the Y terminals of the selection switches 103a and 103b. Meanwhile, a system control circuit 119 reads the state of an operation switch 118 to control the whole VTR, and supplies the required data to a code signal generating circuit 120. This circuit 120 produces additional information such as music number, index and time code as the additional information to be converted to digital data. The system control circuit 119 sends the aforesaid additional information to an $f_6$ generating circuit 121 and a digital data generating circuit 122.

The $f_6$ generating circuit 121 produces an analog pilot signal of predetermined frequency (hereinafter abbreviated to the "$f_6$" signal) in response to those data in the aforesaid additional information, such as index information for heading whose necessity to read is high when the tape runs at the high speed. On the other hand, the digital data generating circuit 122 produces an output including all items of additional information, including the index information for heading, music number and time code described above.

Figure 5:
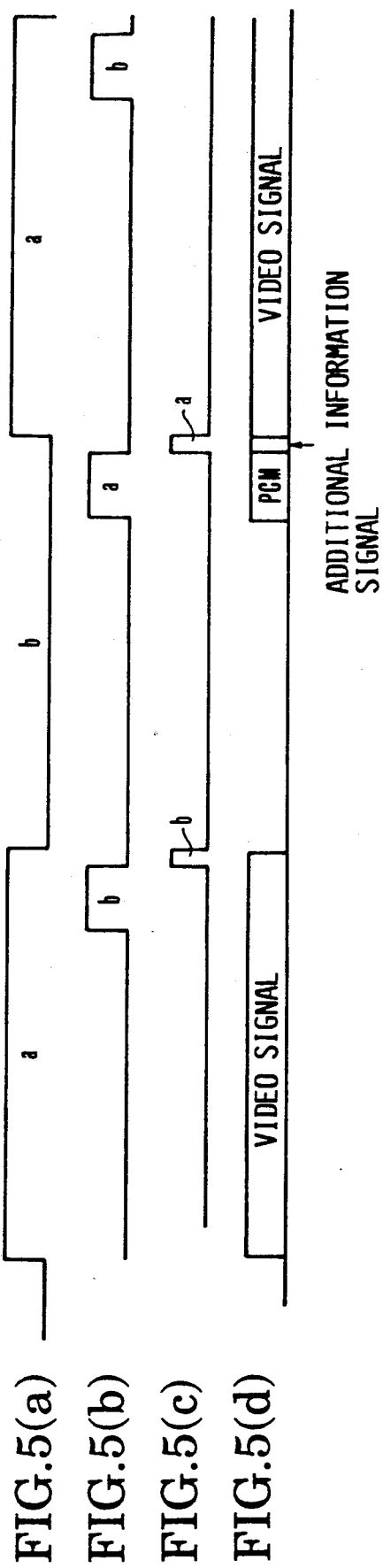
FIGS. 5(a) to 5(d) are timing charts illustrating the timing in which the VTR of FIG. 4

This $f_6$ signal and the digital data signal are frequency-multiplexed by an adding circuit 123, of which the output is applied to the Z terminals of the selection switches 103a and 103b. Here, the timing in which the selection switches 103a and 103b operate is explained by using the timing chart of FIGS. 5(a) to 5(d). FIG. 5(a) shows the timing in which the video signal is recorded. When the signal shown in FIG. 5(a) is at high level, a rotary head 111, or when at low level, another rotary head 112, is selected to record the video signal That is, the switch 103a is connected to the X terminal for a period shown by "a" in the FIG. 5(a), and the switch 103b is connected to the X terminal for a period shown by "b". Also, FIG. 5(b) shows the timing in which the PCM audio signal is recorded. During a period when the signal shown in FIG. 5(b) is at high level, the PCM audio signal is recorded by the rotary head 111 or 112. For the period labeled "a" in FIG. 5(b), the switch 103a is connected to the Y terminal, and for the period labeled "b", the switch 103b is connected to the Y terminal. Further, during the periods in which the signal shown in FIG. 5(c) is at a high level, for the one labeled "a" the switch 103a is connected to the Z terminal, while for the other labeled "b", the switch 103b is connected to the Z terminal. Incidentally, in the switches 103a and 103b, for the periods other than the recording periods of each signal shown in FIGS. 5(a), 5(b) and 5(c), the movable pole of each switch may be arranged either to connect to an arbitrary throw, or to be grounded. It is to be noted that the control of these switches 103a and 103b is made according to the timing control signals "a" and "b" from a timing generating circuit 117.

The output signals from the selection switches 103a and 103b are supplied to adding circuits 132a and 132b, where pilot signals $f_1$, $f_2$, $f_3$ and $f_4$ for tracking control according to the known 4-frequency scheme from a pilot signal generating circuit 131 are selectively added. Their outputs are then supplied to the rotary magnetic heads 111 and 112 located by a phase difference of 180° from each other. FIG. 5(d) shows the signals the head 11 records.

When reproducing a selection switch 110 is moved to its P side in response to an output of a system control circuit 119. The reproduced signals from the heads 111 and 112 are applied through reproducing amplifiers 108 and 109 to selection switches 105a, 105b, 105c, 105d and 105e. By a switching pulse "c" from a timing generating circuit 117, the selection switch 105a selectively puts the outputs of the reproducing amplifiers 108 and 109 onto its output. This switch 105a supplies the reproduced video signal to the video signal processing circuit 101 according to the timing of FIG. 5(a). In accompaniment with this, the reproduced video signal of the original signal form is obtained from the output terminal 125. Also, the switches 105b and 105c are turned on according to switching pulses "d" and "e" from the timing generating circuit 117 respectively in the timing according to FIG. 5(b). For the periods they are on, the PCM audio signal reproduced from each head 111 or 112 is supplied to the PCM signal processing circuit 102. In accompaniment with this, the original analog audio signal is produced from the output terminal 127. Also, the switches 105d and 105e are likewise turned on according to switching pulses "f" and "g", from the timing generating circuit 117, and supply the frequency multiplexed additional information signal according to FIG. 5(c) to an $f_6$ separation circuit 124 and a digital data processing circuit 125. The additional information signals from the $f_6$ separation circuit 124 and the digital data processing circuit 125 each are applied to the system control circuit 119 where they are processed as the music number, index, time code and heading information. That is, according to each of the aforesaid items of additional information data, the system control circuit 119 controls the operation of a capstan control circuit 133 and others to realize the publicly known index scan reproduction, heading and other functions.

The capstan control circuit 133 performs the tracking control according to the known 4-frequency scheme by using the pilot signals $f_1$, $f_2$, $f_3$ and $f_4$ in the output signals of the reproducing amplifiers 108 and 109. Also, the timing generating circuit 117 produces a signal for erasing at an E terminal thereof. This signal for erasing is supplied through an erasing amplifier 115 to a rotary erasing head 113 when the signal on the tape is erased. Also, a rotation phase detecting head 114 detects the phase of rotation of the rotary cylinder having the heads 111 and 112 mounted thereon and produces pulses (shown in FIG. 5(a)) synchronized with the changeover timing for the video signal of the recording or reproducing heads. This pulse is supplied through the amplifier 116 to the timing generating circuit 117, becoming the reference phase for all the timing pulses.

Figure 6:
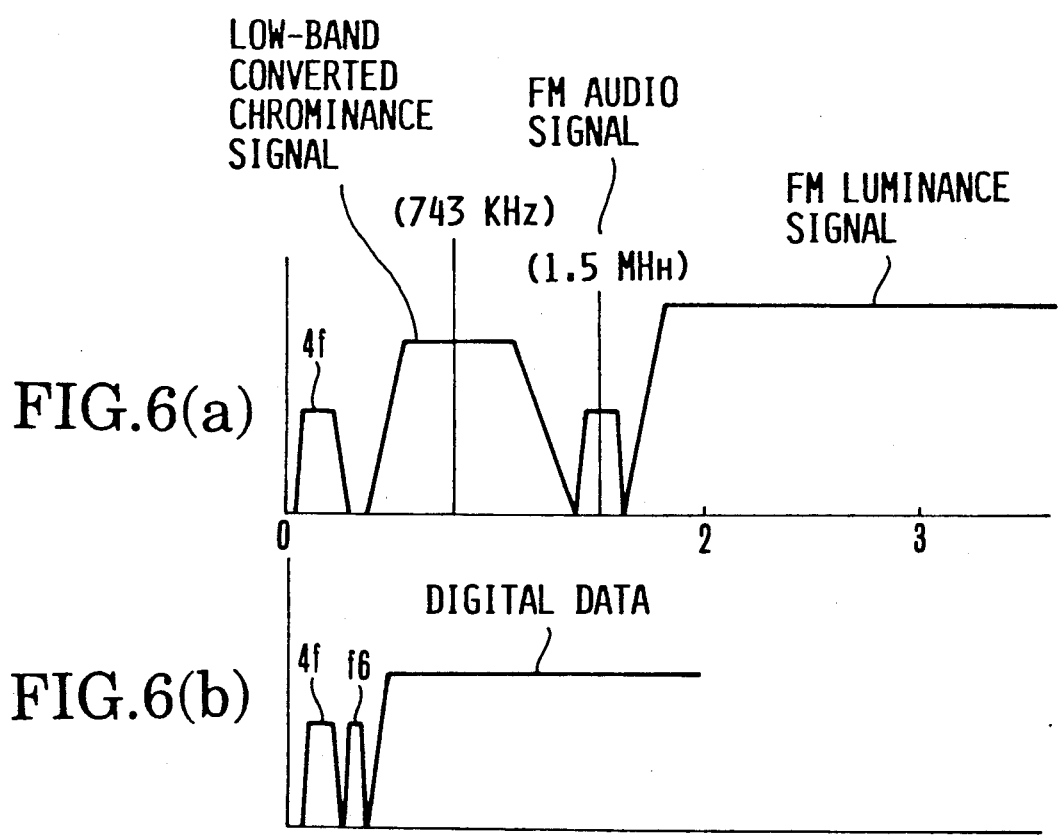
FIGS. 6(a) and 6(b) are diagrams illustrating the frequency allocation of the recording signals by the VTR of FIG. 4.

FIGS. 6(a) and 6(b) are diagrams illustrating the frequency allocation of the recording signals in the VTR of the above-described embodiment. FIG. 6(a) concerns the recording signal in a video signal recording part 11, and FIG. 6(b) concerns the recording signal in the guard band portion 10 constituting an additional information signal recording part. On FIG. 6(a), it is known. So its explanation is omitted. As shown in FIG. 6(b), the frequency $f_6$ of the $f_6$ signal is set lower than that of the low-band converted chrominance signal, but higher than those of the pilot signals according to the 4-frequency scheme. This enables the $f_6$ signal to be reproduced irrespective of the difference of the azimuth angle so that even when the tape is transported at a very high speed, it can sufficiently be detected. Also, the frequency spectrum of the signal the digital data generating circuit 122 produces is predetermined to fall in a range of higher frequencies than the frequency of the $f_6$ signal.

Figure 1:
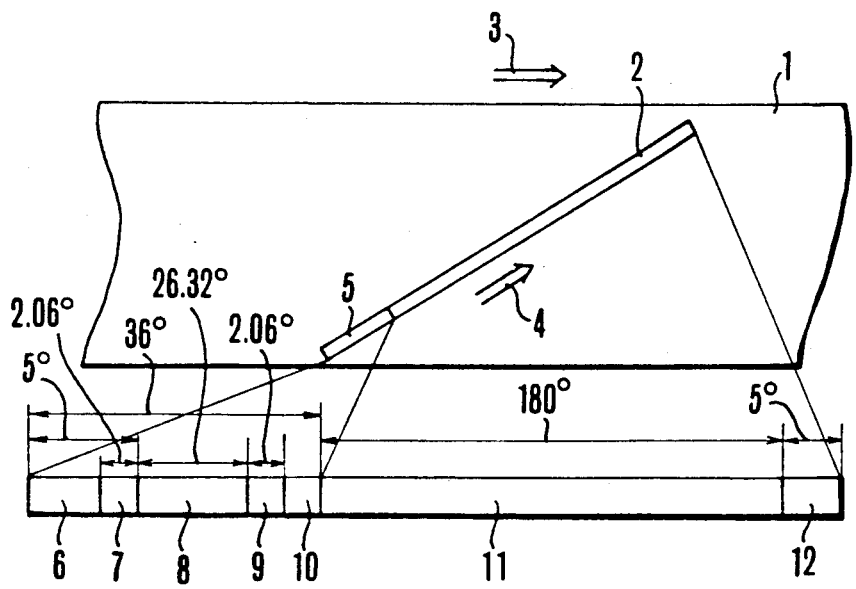
FIG. 1 is a diagram illustrating the record the conventional VTR.
Figure 2:
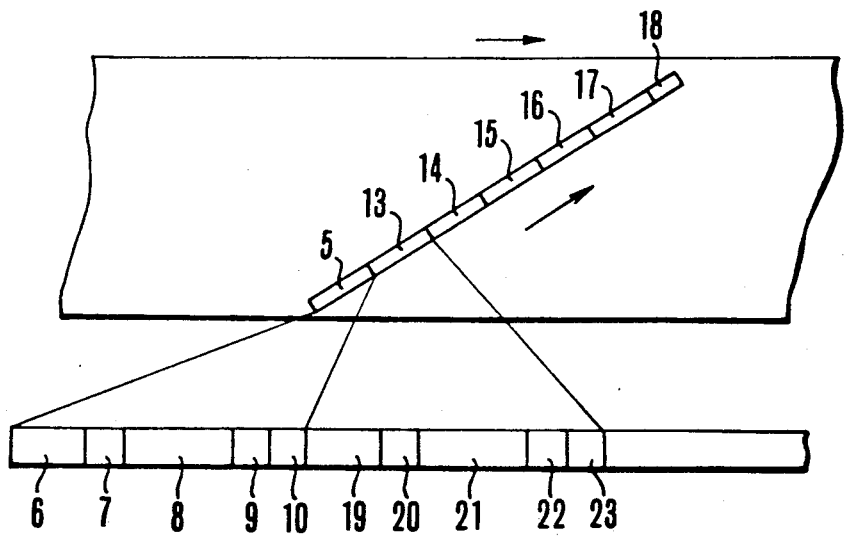
FIG. 2 is a diagram illustrating another record format of the conventional VTR.
Figure 3:
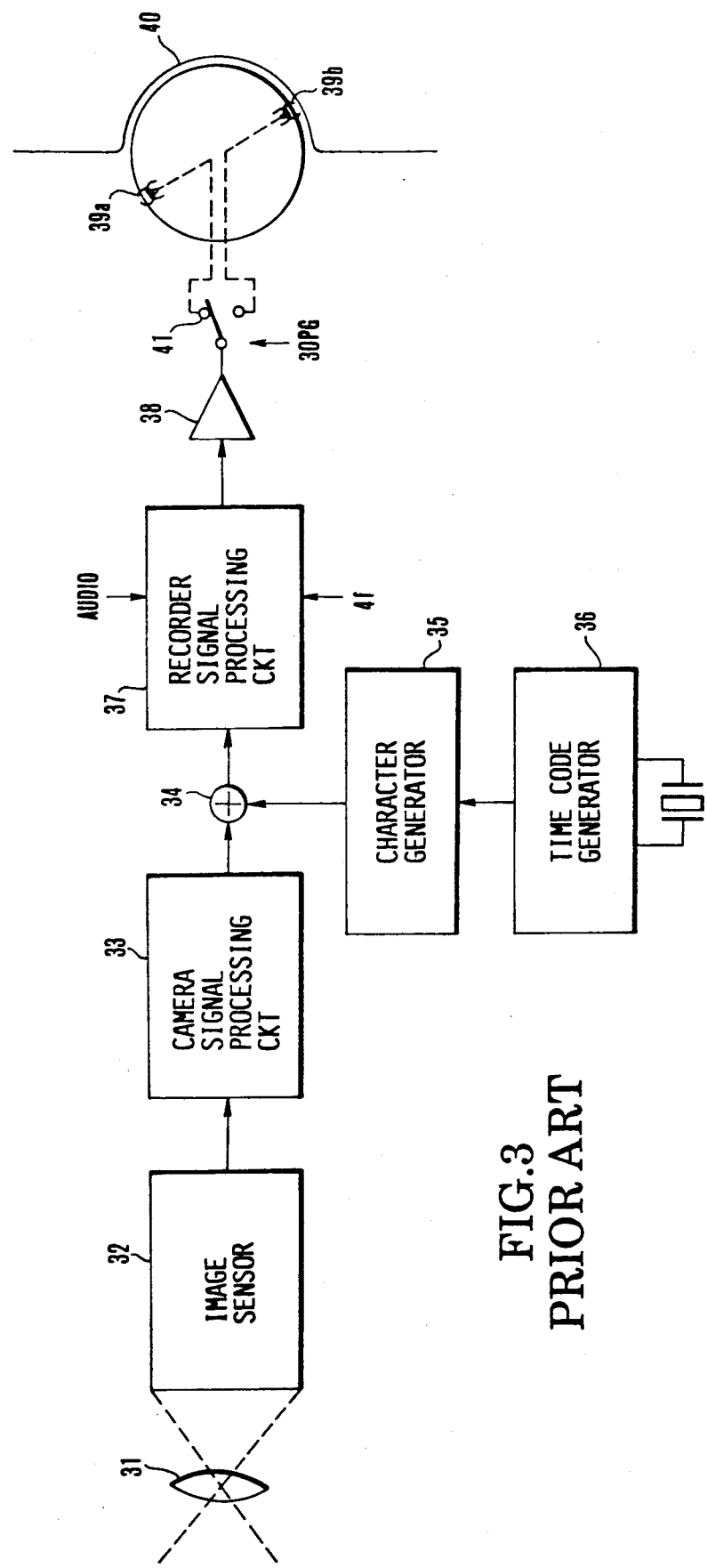
FIG. 3 is a diagram illustrating an example of the construction of the recording system of the conventional camera-unified type VTR.
Figure 7:
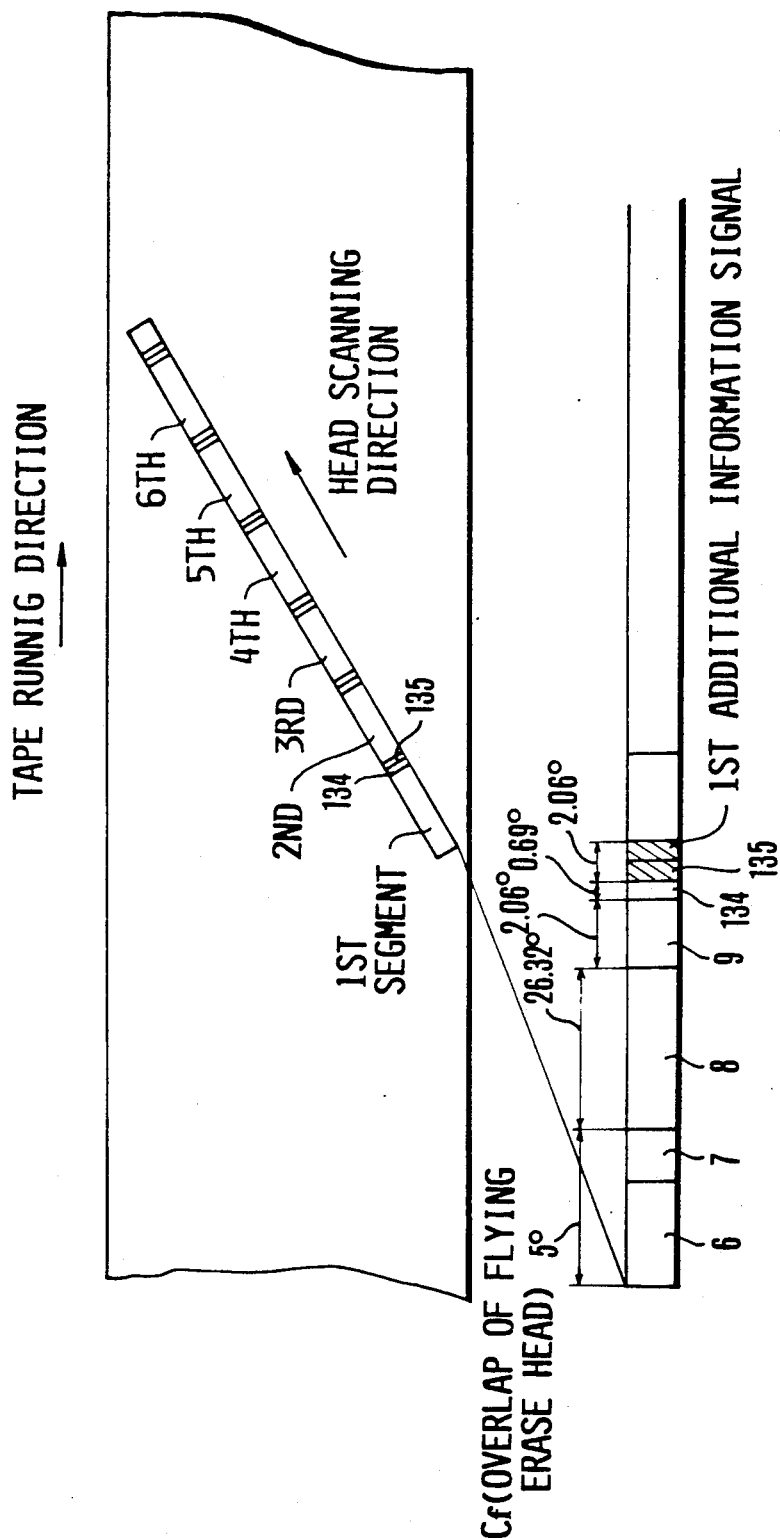
FIG. 7 is a diagram illustrating another example of the record format by the VTR of FIG. 4.

The VTR of the above-described embodiment has a function of performing recording according to the format for recording the PCM audio signals of 6 channels as shown in FIG. 2. Selection of this 6-channel PCM audio record mode and the ordinary mode is realized by controlling the system control circuit 119 by actuating an operation switch 118. That is, the system control circuit 119 controls the switches 105a, 105b, 105c, 105d and 105e so as to perform recording according to the record patterns as shown in FIG. 7. In the format of FIG. 7, the guard band portion 10 in the format of FIG. 2 is divided into a clock run-in portion 134 and a data portion 135, wherein the aforesaid digital additional data are recorded in the data portion 135, while the $f_6$ signal is multiplexed in both of the clock run-in portion 134 and the data portion 135. , Also, these are performed in every segment. This results in the recording of additional information about each of the channels of PCM audio signals.

In such a VTR of the embodiment described above, even when the tape is transported at a very high speed, it is possible to read the additional information by the $f_6$ signal. Thus, the functions such as heading and index scanning can be realized. Also, in a case where it is also desired to record the time code, music number and others the recording can be done by the digital additional information data.

As has been described above, according to the information signal recording apparatus of the above-described embodiment, without taking a large recording area for the additional information, an additional amount of information can be recorded. Moreover, even at the time of high speed transportation of the recording medium, it is made possible to extract the necessary additional information.

Figure 8:
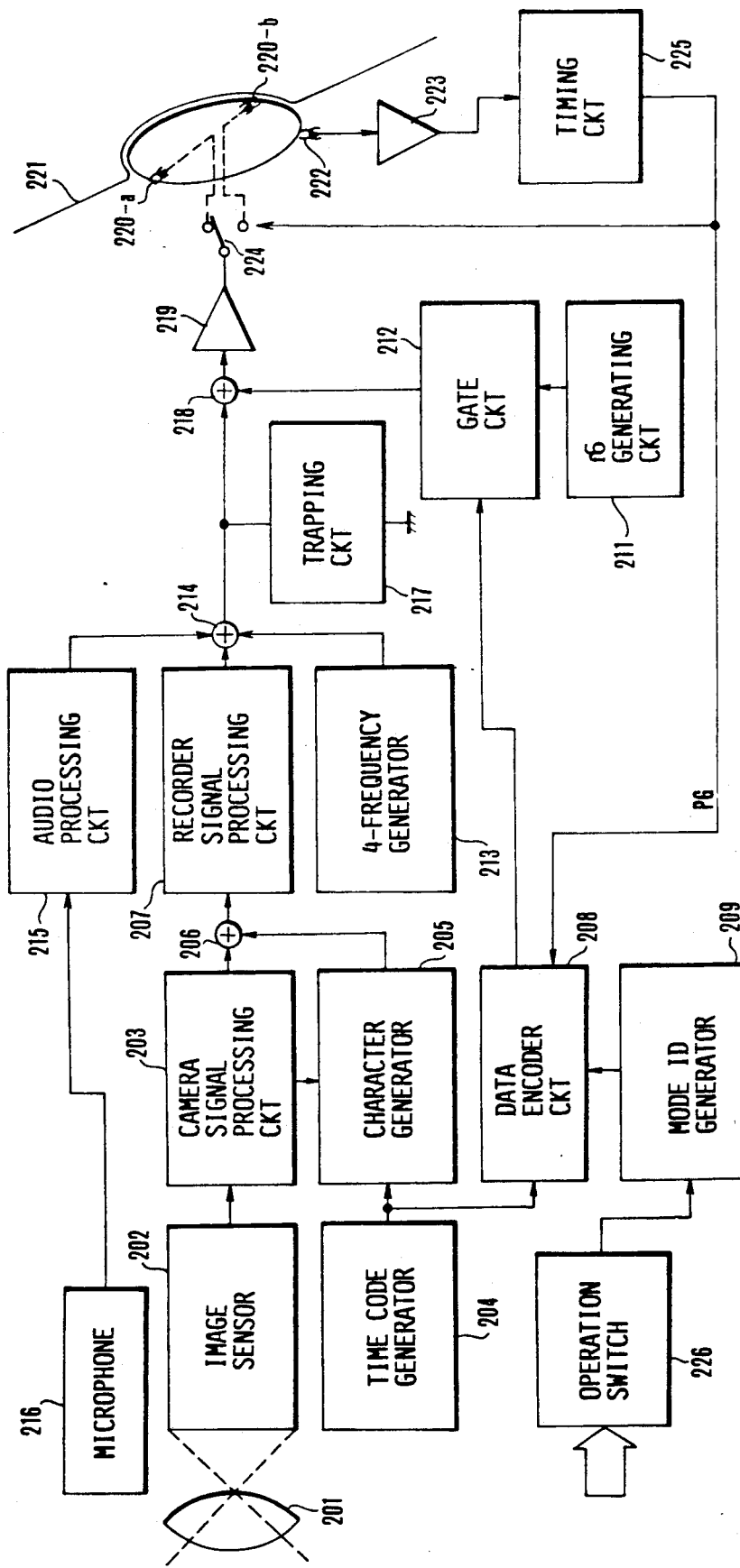
FIG. 8 is a diagram roughly illustrating the construction of another embodiment of a camera-unified type VTR according to the invention.

FIG. 8 is a diagram roughly illustrating the construction of a camera-unified type VTR as another embodiment of the invention. Light rays coming from an object (not shown) to be photographed and entering through an optical system 201 form an image on an image sensor 202. The output of the image sensor 202 is converted to the form of television signals by a known camera signal processing circuit 203.

A time code generator 204 in a similar form to the conventional example of the circuit using the so-called digital clock produces time codes (year, month, day, hour, minute and second) in the form of digital signals. This data is the time code concerning the date and time of shooting or the time counter from the head of the tape in use.

The aforesaid time code is converted likewise as in the conventional example by the character generator 205, if necessary, to the television signal form and is multiplexed on the picked-up television signal. This picked-up television signal produced from the camera signal processing circuit 203 and the character signal concerning the time code produced from the character generator 205 are image-combined by an adder 206.

The combined television signal by the adder 206 is converted to a known recording signal according to the prescribed record format of the VTR. That is, a sound-collected audio signal by a microphone 216 is FM-modulated by an audio processing circuit 215. This FM-modulated signal, along with the pilot signals for tracking of the 4-frequency scheme a 4-frequency generator 213 produces is combined with the video signal produced from the recorder signal processing circuit 207 by an adder 214.

The output of the aforesaid time code generator 204, along with the code output from an ID signal generator 209 for discriminating various modes according to the actuation of the operation switch 226, is supplied to a data encoder 208. By using the output of the data encoder 208, the signal of frequency $f_6$ (hereinafter referred to as the "$f_6$" signal produced by) the $f_6$ generating circuit 211 is subjected to switching (amplitude modulation) by a gate circuit 212. The output of this gate circuit 212 is superimposed by an adder 218 on what is obtained by trapping the $f_6$ component of the signal according to the predetermined record format described before by a trapping circuit 217.

The frequencies of the pilot signals are chosen so that their interference with each of the signals which have conventionally been utilized in the VTR becomes as small as possible. As these frequencies are being conventionally used, there are the four pilot signals (100K-200K) for tracking according to the 4-frequency scheme, the pilot signal (200K-300K) of frequency $f_5$ for use in the DTF control or in multichannel record discrimination of the PCM audio and the low-band converted chrominance signals (743K±350 K). The time code in the VTR of the present embodiment, if in support of the SEMPTE time code, can be recorded when there is a band of about 10 KHz. So, a frequency in between the upper limit (about 300 K) of the $f_5$ signal and the lower limit (about 400 K) of the low-band converted chrominance signal minus a margin of more than 10K is taken $f_6$ and made to be a modulation carrier.

Figure 9:
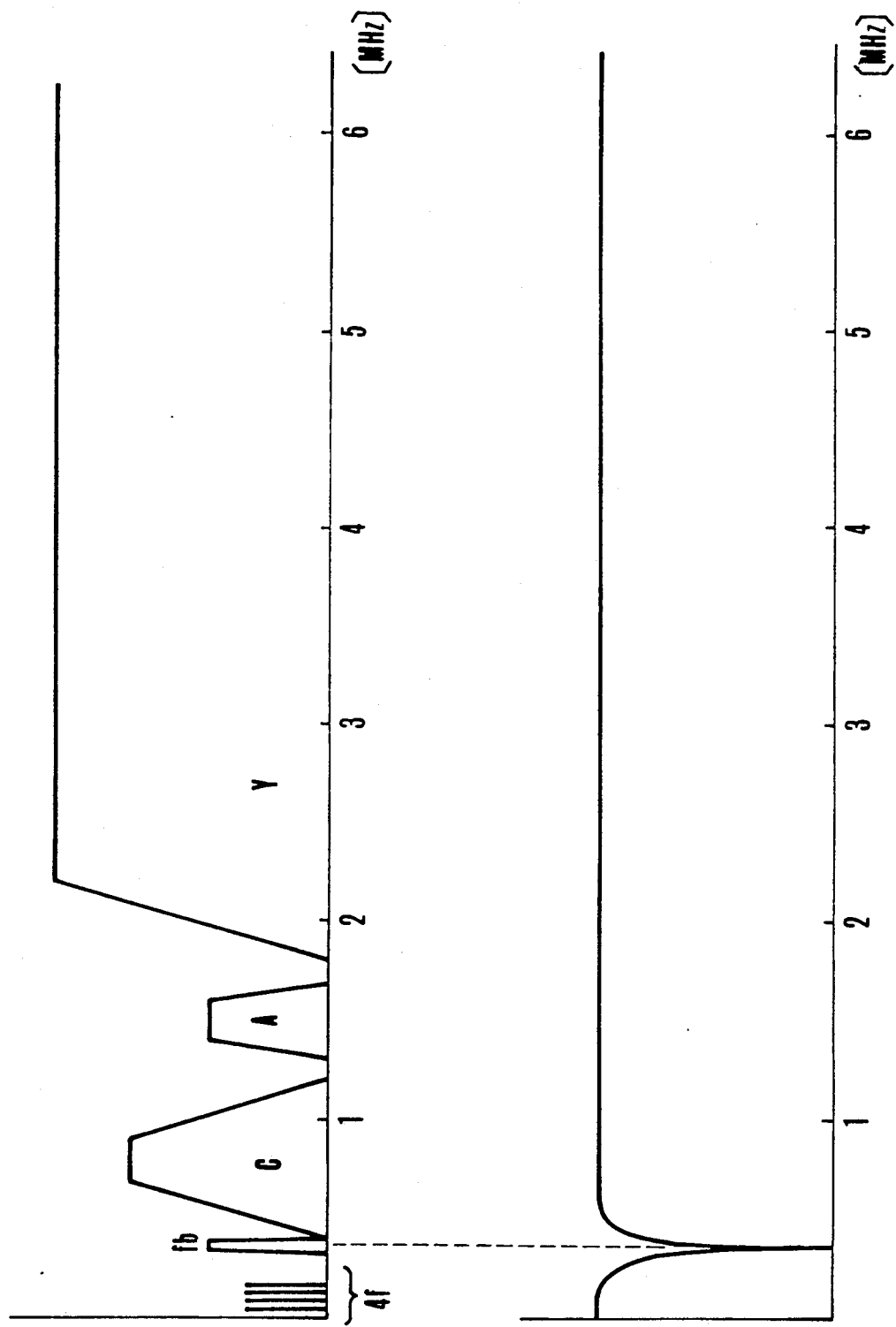
FIG. 9 is a diagram to explain the recording signal by the VTR of FIG. 8.

It is to be noted that the aforesaid trapping circuit 217 is provided for removing the corresponding frequency component to the $f_6$ from the intrinsic recording signal to prevent a faulty operation from occurring. The arrangement diagram of the aforesaid frequency spectrum after the superimposition of the $f_6$ signal is shown in the upper half of FIG. 9, and the frequency characteristic curve of the trapping circuit 217 is shown in the lower half of FIG. 9.

The thus-obtained recording signal is amplified by a recording amplifier 219 and applied through a switch 224 which is operated by 30 PG pulses of the frame period to be described later to two rotary heads 220-a and 220-b of different azimuth angle, by which it is recorded on the tape while forming tracks.

The rotation of the rotary drum carrying the rotary heads 220-a and 220-b is detected by a rotation phase detecting head 222 and an amplifier 223 to perform delay processing or the like so that the timing circuit 225 produces the aforesaid 30 PG pulses in the predetermined timing. This 30 PG pulse, as the reference timing of sync. data generation of time information array from track to track, is utilized in the data encoder circuit 208.

Figure 10:
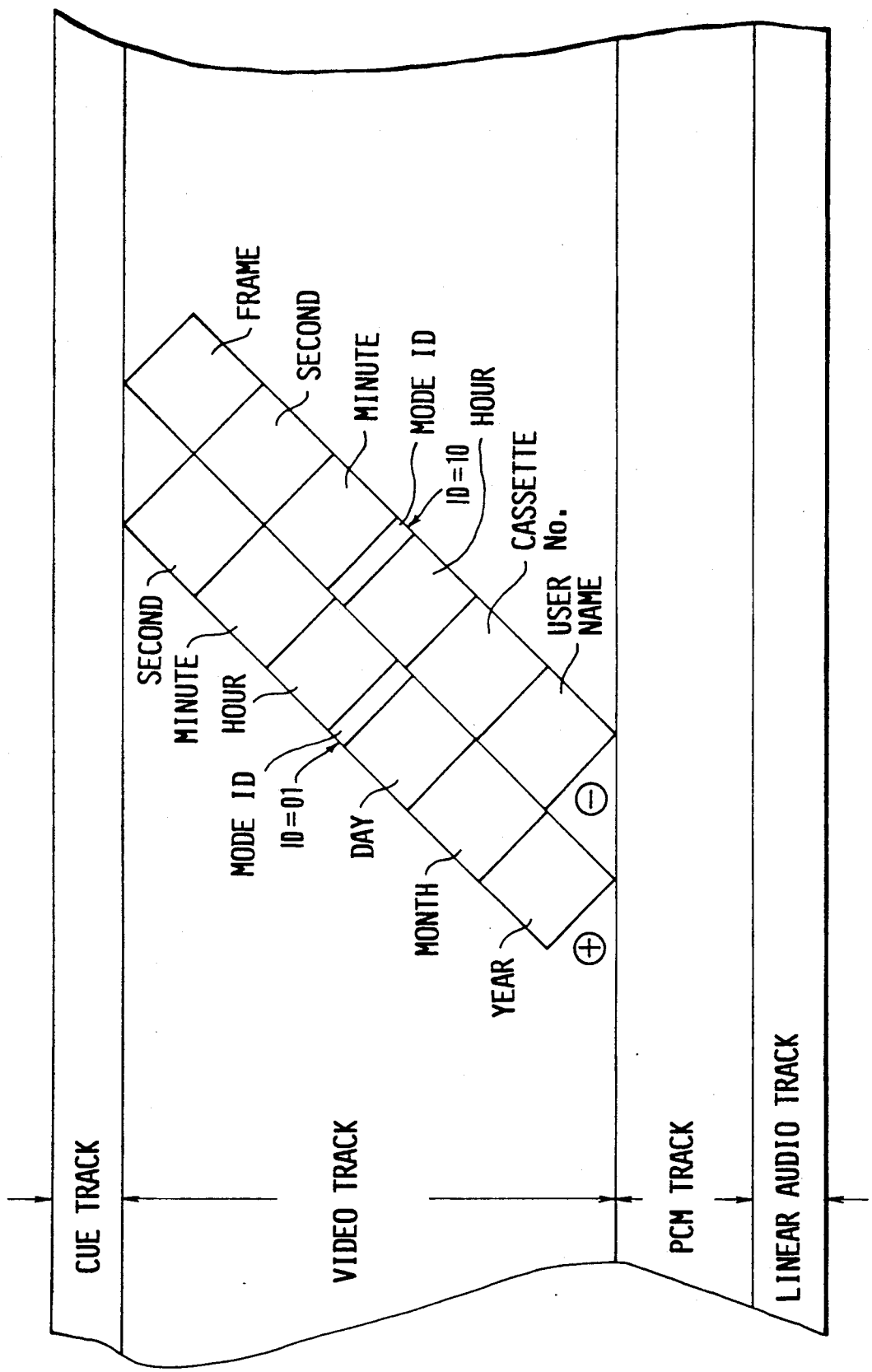
FIG. 10 is a diagram illustrating the record format on the tape by the VTR of FIG. 8.

The recorded track pattern of the VTR of the present embodiment is shown in FIG. 10. The recording signals including the video signals, FM-modulated audio signals and the modulated signals of the $f_6$ signals, are recorded in the video signal recording area with the plus azimuth;- and the minus azimuth alternating each other. In the aforesaid modulated signal of the $f_6$ signal, the information representing the shooting date and time is recorded in the plus azimuth track, while the information representing the counted time from the end of the tape in use is recorded in the minus azimuth track. Those parts in the figure which are labeled ID are the mode data representing the content of the time code of each track. "01" and "10" of this ID correspond respectively to the two items of time information, or the shooting date and time, and the time from the tape end. This ID word is positioned in the central portion of each track so as to be convenient when the search mode to be described later is operated. When the tape runs at the high speed, the reproduction envelope is not obtained over the entire length of the track. As a result, the mode information is located near to affecting information to the actual searching. Thus, the probability of reproducing and detecting them at the same time is increased.

Also, as the check bits for preventing the faulty operation from occurring when the tape which was recorded by the apparatus not employing this system is reproduced, that ID word can be used. For this purpose, the bits are allocated by averting "11" and "00".

Figure 11:
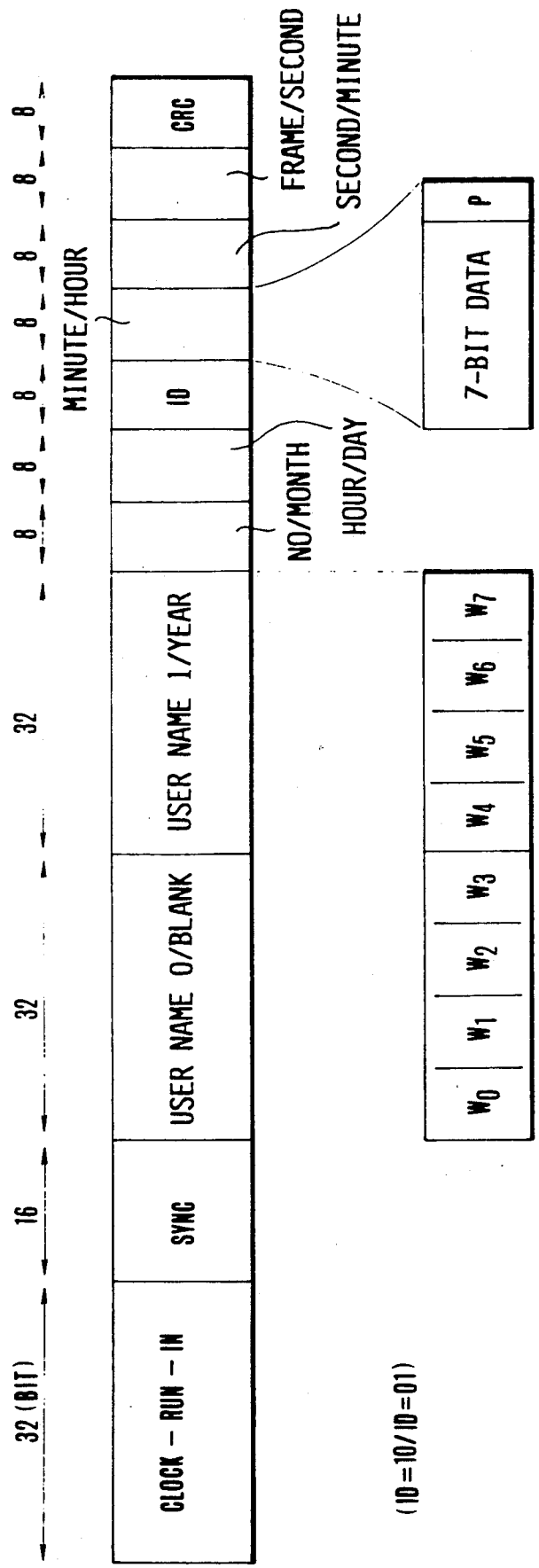
FIG. 11 is a diagram illustrating the record format of additional information data by the VTR of FIG. 8.

For example, the information representing the shooting date and time, the year, month and day of the shooting date, the mode information and the hour, minute and second of the shooting time are recorded in this order from the lower side of the tape. The digital recording, in actual practice, besides the aforesaid contents, as shown in FIG. 11, is headed with the information of the clock run-in (32 bit) and the sync. data (16 bit) and, behind the information, is provided with a CRC (8 bit) for error correction. It is to be noted that the code representing the month, day, hour, minute, second, frame and ID has 7 bits at maximum and is provided with 1 bit as the parity check bit, thus being treated as 8 bits in total. That is, when searching, the error detection is carried out only by the aforesaid parity of 1 bit, while when in the ordinary reproduction, the error correction can be carried out by track unit.

For reference, an example of mode settings by utilizing 2 bits of the ID data 7 bits is shown in Table 1 below.

| Mode | Content |
| --- | --- |
| 00 | No use (spare) |
| 01 | Dating Information |
| 10 | Counter Information |
| 11 | Heading Signal |

Next, the data detecting and searching operations when in reproduction are described.

Figure 12:
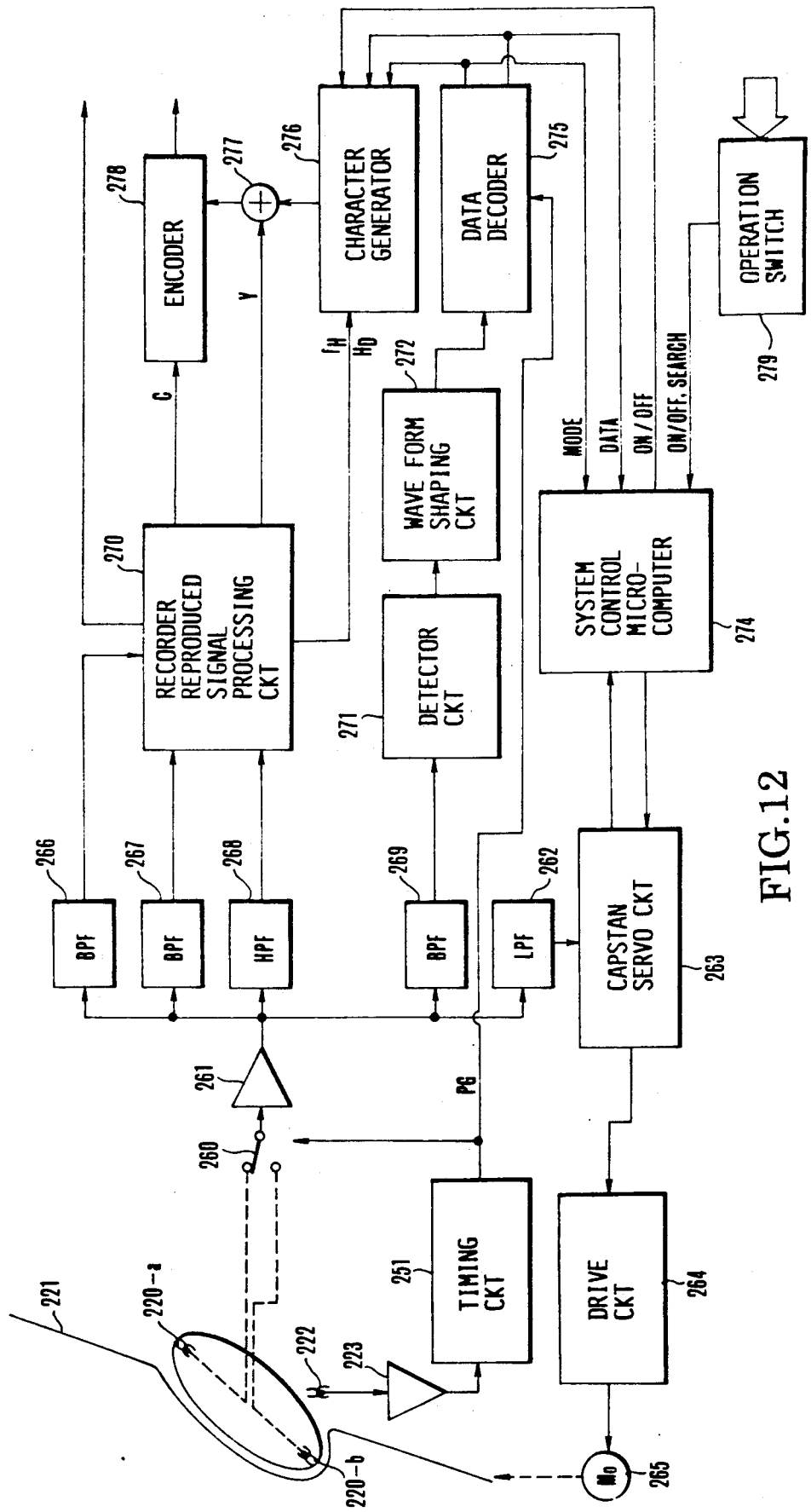
FIG. 12 is a diagram roughly illustrating the construction of the reproducing system of the VTR of FIG. 8.

An example of the construction of the corresponding reproduction system to the camcorder of FIG. 8 is shown in FIG. 12. The signals detected from the tape 221 by the rotary heads 220-a and 220-b are selected one at a time by a switch 260 in response to 30 PG by each 180° rotation of the head drum, amplified by a head amplifier 261 and supplied to various filters. The drum rotation phase signal detected by the drum rotation detecting head 222 is amplified by an amplifier 223 and applied to a timing circuit 251, which then produces 30 PG pulses of predetermined timing. The PG pulses are supplied to the switch 260 and a data decoder 275. The data decoder 275 discriminates ± of the azimuth angle by the 30 PG pulses.

BPF 266 designates a band pass filter for audio signal extraction, BPF 267 designates a band pass filter for chrominance signal extraction, and HPF 268 designates a high pass filter for luminance signal extraction. The signal extracted by these filters is subjected to the reverse processing to that when recording by a recorder reproduced signal processing circuit 270.

BPF 269 designates a band pass filter for $f_6$ signal extraction whose central frequency and band are made to match the frequency and side-band of the $f_6$ signal carrier. The output of this BPF 269 is converted to a digital signal by a detector circuit 271 and a wave form shaping circuit 272. Further, this digital signal is demodulated to the time code by a data decoder 275. When modulating, the aforesaid 30 PG pulse is used as the auxiliary information to discriminate the azimuth angles for determining the mode when detection of the start point of the clock run-in or detection of the ID data cannot be carried out.

The thus-demodulated time code is supplied to a character generator 276 to obtain the character information. This character information, after having been superimposed on the luminance signal in an adder 277, is supplied to an NTSC encoder 278 where a composite video signal is made up from it. This signal is outputted together with the demodulated audio signal.

A major difference of the apparatus of the present embodiment from the conventional apparatus is that the signal from the operating switch 279 is supplied to the character generator 276 via the system control microcomputer (hereinafter referred to as "syscon") 274. By this, it is made possible to switch on or off superimposition of the time code on the picture information at any desired time by manipulating the operating switch 279. Means may be so constructed and so arranged that for example, when the superimposition is cut off, the output data of the data decoder 275 are all replaced by the corresponding data to blank in the character generator 276 in response to indication from the syscon 274.

The time code demodulated in such a way, besides its use in the above-described display, can be utilized in searching. That is, since the demodulated data obtained by the data decoder 275 is always supplied to the syscon 274, it can be compared with the target value the operation switch 279 has indicated when searching to derive the difference value between these two time values. By this difference value, the tape transportation is controlled. Thus, it is made possible to search the desired tape position.

The normal tape transportation is controlled by a capstan servo. The reproduced signal from the amplifier 261 is supplied to an LPF 262. By this LPF 262, only the pilot signals that follow the 4-frequency rule are extracted. They are then processed by a capstan servo circuit 263 including a known tracking control circuit. Then, a capstan motor 265 is driven by a drive circuit 264 to transport the tape-shaped recording medium 221.

Figure 13:
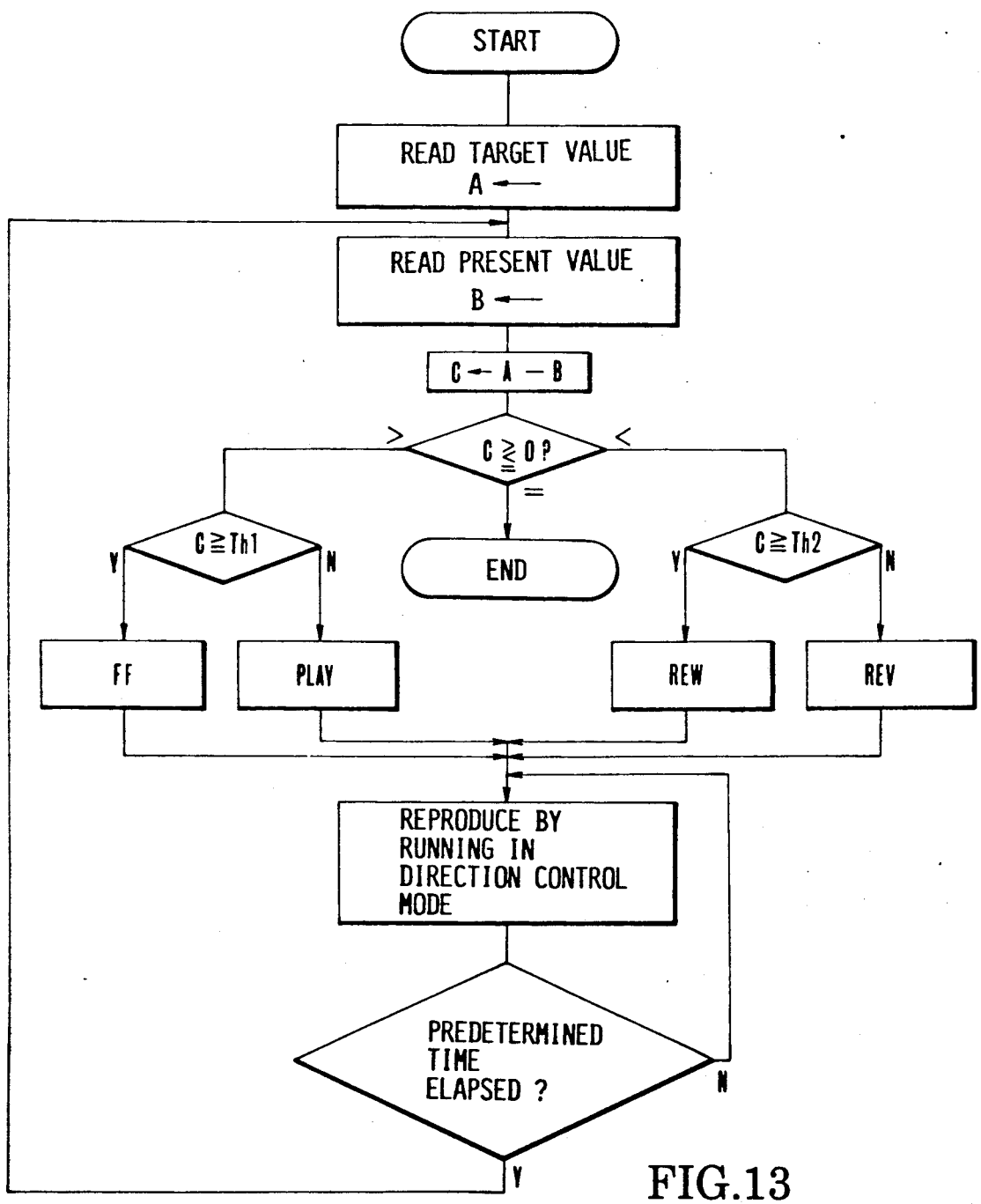
FIG. 13 is a flowchart to explain the operation of the system control microcomputer when searching by the arrangement of FIG. 12.

This apparatus has a further capability of controlling the capstan in accordance with indication from the operation switch 279 when the above-described searching is performed. For this purpose, a control signal is supplied from the syscon 274 to the servo circuit 263. A forming operation of this control signal of the syscon 274 is shown in the flowchart of FIG. 13.

In the following, reference is made to the flowchart of FIG. 13. When the operation switch 279 gives an indication of "date search" (or "time search" or "time counter search" also likewise) to the microcomputer 274, the flow starts. The target value of the search indication is read as the information from the ten keys of the operation switch 279 and set in A. Subsequently, the current tape position is read from the tape itself into the data decoder 275 and then therefrom to the microcomputer 274 and set in B. And, in order to know the difference between the present position and the target position in the reduced form to time, A − B is computed and the result is set in C. Here whether the value of C is positive, or negative, or zero is examined. If C=0, as it implies that the current position coincides with the target position, the processing is terminated. If C>0, as it implies that the target value is ahead, the tape is transported forward. Further, if larger than a predetermined value Th1, as it implies that it is considerably far away, and the fast feed search is carried out. Also, if smaller than the predetermined value Th1, as it implies that it is relatively near, and the normal reproduction (PALY) is carried out. If C<0, as it implies that the target value is behind, the tape is transported in the reverse direction. Further, if larger than a predetermined value Th2 (may be equal to Th1), the fast rewind search (REW) is carried out. Also, if smaller than the predetermined value Th2, the reverse reproduction (REV) is carried out. These tape transport modes are set as the direction control modes so that the capstan servo circuit 263 is controlled in accordance with the direction control mode.

After the tape has been transported in the aforesaid mode for a predetermined time, the current position is confirmed again. Such a procedure is repeated until the target value and the present value coincide with each other.

In such a manner, the "date search" that performs tape searching by indicating the date becomes possible.

In the apparatus of the above-described embodiment, various items of additional information can be recorded without hindering the high density recording. Also, since this additional information is recorded as the analog signal of low frequency, even when the tape is made to run at the high speed, it becomes possible to detect easily. Further, since a wide variety of items of additional information can be extracted at the time of the fast speed running of the tape, a quite new function called "date search", too, becomes possible to realize.

What is claimed is:

1. An information signal recording apparatus, comprising:
   (a) head means for recording a signal on a recording medium;
   (b) main generating means for producing a first recording signal concerning a main information signal;
   (c) first forming means for producing a digital additional information signal;
   (d) second forming means for producing an analog additional information signal;
   (e) mixing means for mixing said digital additional information signal and said analog additional information signal to produce a second recording signal; and
   (f) time-division multiplex means for time-divisionally multiplexing said first recording signal and said second recording signal and supplying an output signal to said head means.

2. An apparatus according to claim 1, wherein said head means includes rotary heads, said rotary heads recording signals on said recording medium while forming a great number of parallel tracks to each other successively.

3. An apparatus according to claim 1, wherein said main information signal includes an analog video signal.

4. An apparatus according to claim 1, wherein said main information signal includes a digital audio signal.

5. An apparatus according to claim 1, further comprising means for producing a pilot signal, and wherein said pilot signal is frequency-multiplexed on each of said first recording signal and said second recording signal.

6. An apparatus according to claim 5, wherein said head means is able to reproduce said first recording signal and said second recording signal from said recording medium, said apparatus further comprising tracking control means for controlling a relative position of said recording medium to said head means by using the pilot signal of either said first or said second recording signal reproduced by said head means.

7. An information signal recording apparatus, comprising:
   (a) head means for recording a signal on a recording medium;
   (b) first generating means for producing a first recording signal concerning a first main information signal;
   (c) second generating means for producing a second recording signal concerning a second main information signal;
   (d) first forming means for producing a digital additional information signal;
   (e) second forming means for producing an analog additional information signal;
   (f) mixing means for mixing said digital additional information signal and said analog additional information signal to produce a third recording signal; and
   (g) time-division multiplex means for time-divisionally multiplexing said first recording signal, said second recording signal and said third recording signal and supplying an output signal to said head means, said time-division multiplex means arranging said third recording signal in between said first recording signal and said second recording signal.

8. An apparatus according to claim 7, wherein said first main information signal includes an analog video signal, and wherein said second main information signal includes a digital audio signal.

9. An information signal recording apparatus, comprising:
   (a) main recording means for recording a main information signal on a recording medium;
   (b) first forming means for producing a digital additional information signal;
   (c) second forming means for producing an analog additional information signal;
   (d) mixing means for mixing said digital additional information signal and said analog additional information signal to produce mixed additional information; and
   (e) additional information recording means for recording said mixed additional information on said recording medium.

10. A video signal recording apparatus, comprising:
    (a) means for producing a video signal;
    (b) means for producing a pilot signal for tracking control;
    (c) means for producing digital additional information consisting of at least two bits;
    (d) modulating means for modulating said digital additional information by an analog carrier signal to produce an analog additional information signal, said analog carrier signal having a frequency in between a frequency band of said video signal and a frequency of said pilot signal;

(e) mixing means for frequency-multiplexing said video signal, said pilot signal and said analog additional information signal to produce a recording signal; and (f) recording means for recording the recording signal obtained by said mixing means on a recording medium.

11. An apparatus according to claim 10, wherein said mixing means includes a first mixing circuit for frequency-multiplexing said video signal and said pilot signal, a trapping circuit for trapping a frequency component corresponding to a frequency of said analog carrier signal from an output of said first mixing circuit, and a second mixing circuit for frequency-multiplexing an output of said trapping circuit and said analog additional information signal to produce a recording signal.

12. An apparatus according to claim 10, wherein said video signal generating means includes means for producing a picked-up picture video signal, means for producing a character video signal representing at least part of said digital additional information, and means for mixing said picture video signal and said character video signal.

13. An apparatus according to claim 12, wherein said digital additional information includes information of date and time.

14. A video signal recording apparatus, comprising:

(a) first generating means for producing a picked-up picture video signal;

(b) second generating means for producing digital additional information consisting of at least two bits;

(c) third generating means for producing a character video signal representing at least part of said digital additional information;

(d) mixing means for mixing said picture video signal and said character video signal to produce a composite video signal;

(e) fourth generating means for producing an additional information signal concerning said digital additional information; and (f) recording means for recording said composite video signal and said additional information signal on a recording medium.

15. An apparatus according to claim 14, wherein said fourth generating means includes modulating means for modulating said digital additional information by an analog carrier signal to produce an analog additional information signal, said analog carrier signal having a frequency of different band from a frequency band of said composite video signal.

16. An apparatus according to claim 15, wherein said recording means includes a circuit for frequency-multiplexing said composite video signal and said analog additional information signal.

17. An information signal recording and reproducing apparatus comprising:

(a) first recording means for recording a main information signal on a recording medium;

(b) second recording means for recording an additional information panel including date information on said recording medium;

(c) first reproducing means for reproducing said main information signal from said recording medium;

(d) second reproducing means for reproducing said additional information signal from said recording medium;

(e) transporting means for transporting said recording medium;

(f) separating means for separating said date information from a signal reproduced by said second reproducing means; and (g) control means for controlling transportation of said recording medium by using said date information separated by said separating mean.

18. An apparatus according to claim 17, wherein said main information signal includes a video signal, and said first recording means includes a first generating means for producing a picked-up picture video signal, second generating means for producing a character video signal representing said date information and mixing means for said picture video signal and said character video signal.

* * * * *

UNITED STATES PATENT AND TRADEMARK OFFICE
CERTIFICATE OF CORRECTION

PATENT NO. : 5,132,807                    Page 1 of 2
DATED     : July 21, 1992
INVENTOR(S) : Hiroyuki Takimoto et al.

It is certified that error appears in the above-identified patent and that said Letters Patent is hereby corrected as shown below:

Col. 1, line 34. Delete "make"

Col. 2, line 17. Change "has" to -- have --

Col. 2, line 52. Delete "as"

Col. 3, lines 42-43. Delete "taking a larger recording area for additional information,--

Col. 4, line 3. After "to" insert -- increase --

Col. 4, line 26. After "record" insert -- format of --

Col. 4, line 37. After "FIG. 4" insert -- operates.--

Col. 5, line 38. After "signal" insert -- . --

Col. 6, line 3. After "reproducing" insert -- , --

Col. 8, line 12. Change "signal produced by)" to -- signal) produced by --

Col. 8, line 48. Delete " . "

Col. 8, line 64. Delete " ;- "

Col. 9, line 12. Change "affecting information" to -- information affecting -- and Delete "to" second occurrence Col. 14, line 20. Change "panel" to -- signal --

Col. 14, line 37. Delete "a"

UNITED STATES PATENT AND TRADEMARK OFFICE
CERTIFICATE OF CORRECTION

PATENT NO. : 5,132,807
DATED : July 21, 1992
INVENTOR(S) : Hiroyuki Takimoto et al It is certified that error appears in the above-indentified patent and that said Letters Patent is hereby corrected as shown below:

Col. 14, line 41, after "for" insert --mixing--

Signed and Sealed this

Twelfth Day of October, 1993

Attest:

BRUCE LEHMAN

Attesting Officer

Commissioner of Patents and Trademarks